Jan. 4, 1944.　　　　J. H. PAGE　　　　2,338,532

PAY ROLL BOARD

Filed Nov. 2, 1942　　　　3 Sheets-Sheet 1

INVENTOR.
John H. Page,

Jan. 4, 1944.                    J. H. PAGE                    2,338,532
                              PAY ROLL BOARD
                            Filed Nov. 2, 1942              3 Sheets-Sheet 2

INVENTOR.
John H. Page
BY Mehlhope & Poole
Attys

Witness:
Chas. R. Hursh.

Jan. 4, 1944. J. H. PAGE 2,338,532
PAY ROLL BOARD
Filed Nov. 2, 1942 3 Sheets-Sheet 3
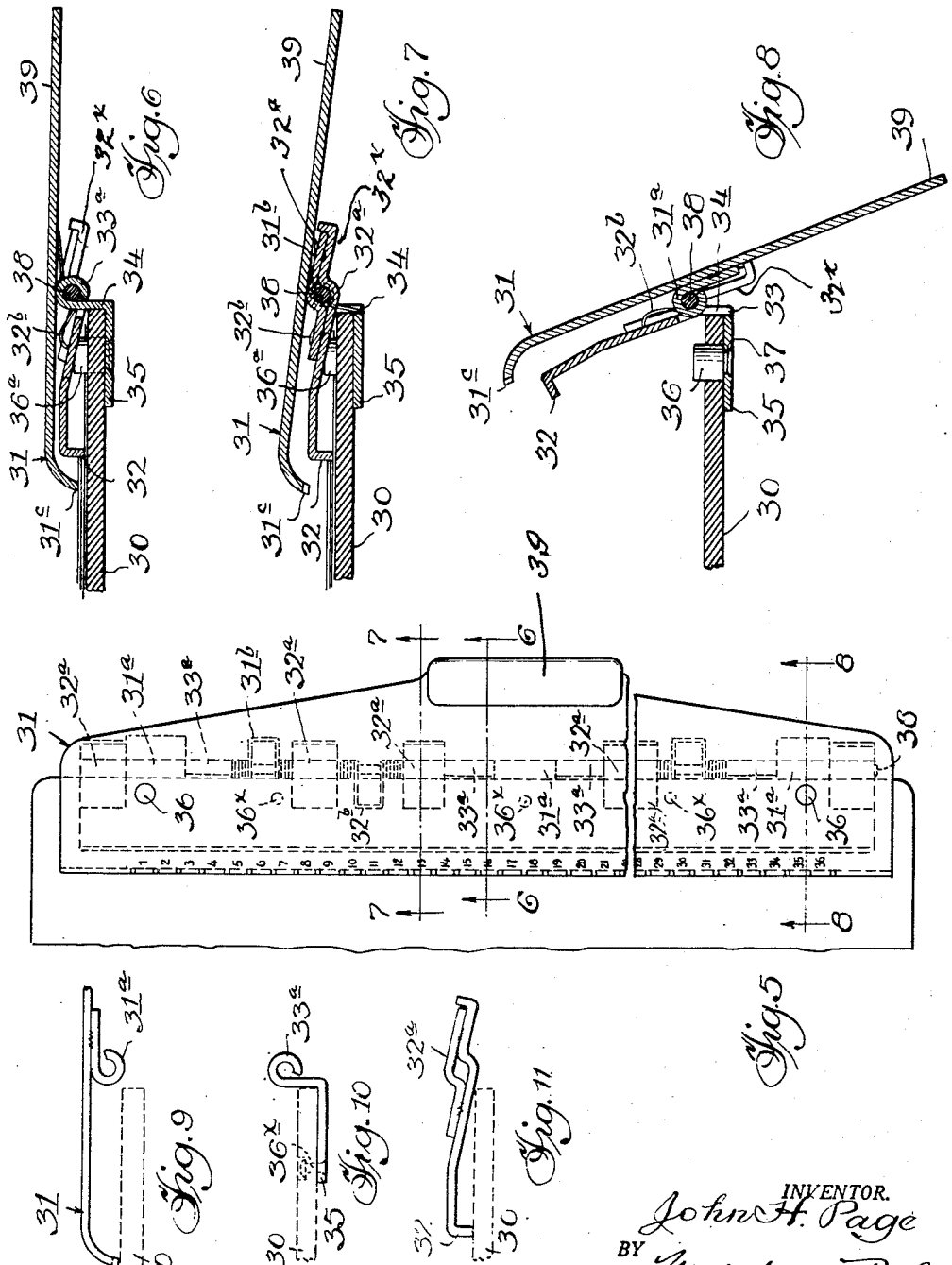
INVENTOR.
John H. Page Patented Jan. 4, 1944

2,338,532

UNITED STATES PATENT OFFICE 2,338,532

PAY ROLL BOARD

John H. Page, Muskegon, Mich., assignor to The Shaw-Walker Company, Muskegon, Mich., a corporation of Michigan Application November 2, 1942, Serial No. 464,268

6 Claims. (Cl. 282—29)

This invention relates to a pay roll board and consists of the matters hereinafter described and more particularly pointed out in the appended claims.

The invention relates to the type of pay roll board described in an application for patent, Serial No. 463,986, filed by Lois K. Straus on the 30th day of October, 1942.

The improved pay roll board includes a writing board, means providing a straight edge rising from said board near one end thereof, means for detachably holding a vertically and horizontally ruled pay roll sheet on said board with its horizontal rulings at right angles to said straight edge, a scale adjacent said straight edge presenting numerically indicated spaces, and a clamping member, said scale and clamping member extending parallel to said straight edge and being adapted to maintain a similarly ruled employee's earnings sheet and an employee's pay slip in predetermined superposed relation upon each other and upon said pay roll sheet.

The object of the invention is to simplify and improve the parts comprising the straight edge, the scale and the clamping member for the several printed forms to be assembled on the board, and also the means for securing said parts to the board in operative relation thereto and to each other.

The advantages of the invention will appear more fully as I proceed with my specification.

In the drawings:

Figure 1 indicates a top plan view of the improved pay roll board with the several printed forms designed for use therewith assembled on the board and held by the clamping member in proper right angular relation to the straight edge and in alignment with a predetermined numeral on the scale.

Figure 2:
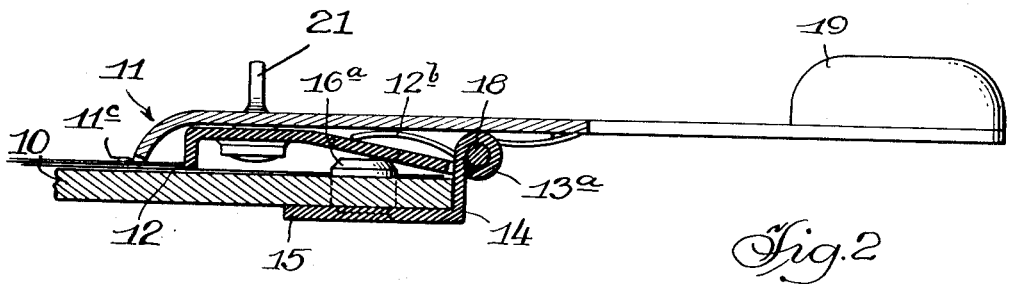
Figure 2 is a partial horizontal section through Figure 1 on an enlarged scale in a plane indicated by the line 2—2 of Figure 1.
Figure 3:
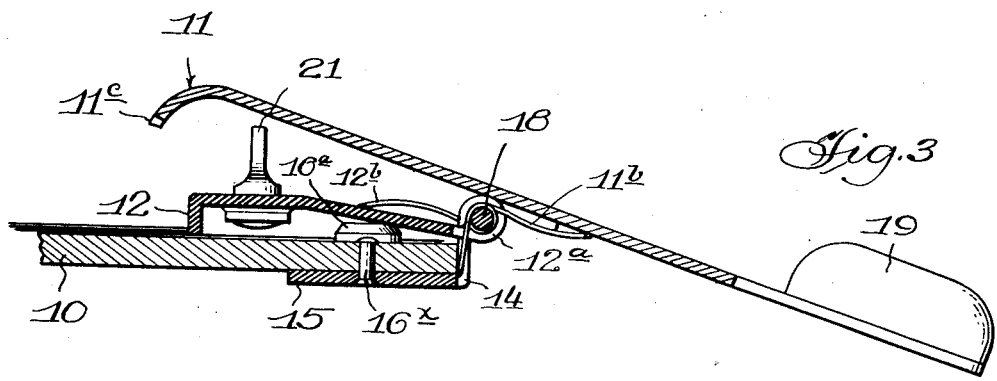
Figure 3 is a view similar to Figure 2, with the clamping member shown in raised relation, but with the straight edge engaged with the board.
Figure 4:
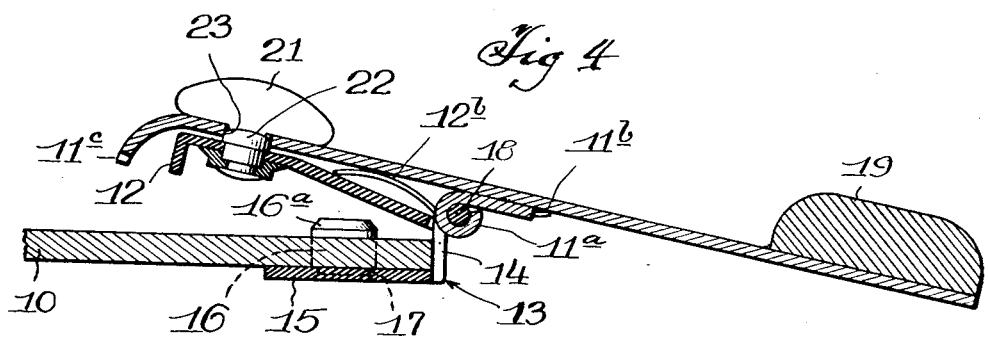

Figure 4 is a view similar to Figure 2, with the clamping member and the straight edge operated as a unit, raised from the board. The planes of the sections 3 and 4 are indicated, respectively, by the lines 3—3 and 4—4 of Figure 1.

Figure 5 is a view representing a fragmentary top plan view of a pay roll board embodying a modified form of the invention.

Figure 6 is a horizontal section through Figure 5 on an enlarged scale in a plane indicated by the line 6—6 of Figure 5.

Figure 7 is a view similar to Figure 6, with the clamping member shown in raised relation, but with the straight edge engaged with the board. Line 7—7 of Fig. 5 shows plane of section.

Figure 8 is a view similar to Figure 6, with the clamping member and the straight edge operated as a unit, raised from the board. Line 8—8 of Fig. 5 indicates plane of section.

Figures 9, 10 and 11 are views representing side elevations of the clamping member, the fixed hinge member attached to the board, and of the straight edge member, respectively, showing in each case the respective devices for providing the associated knuckles for the hinge by which they are connected together.

Referring now to that embodiment of the invention illustrated in Figures 1 to 4 in the drawings: 10 indicates the pay roll board. Said board is made of any suitable material of sufficient rigidity to present and maintain a flat, unwarped surface, preferably wood or other fibrous material such as Masonite or the like. 11 indicates a clamping member, and 12 indicates the straight edge. Said parts extend transversely of the board 10 near one end thereof in parallel relation to each other and to said end. By means now to be described, the clamping member 11 and the straight edge 12 are each hinged to the board so that they may be independently raised or lowered with reference thereto. They may also be connected together or otherwise engaged together so as to be operated as a unit.

The straight edge member 12 is provided at suitable intervals along its rear edge with narrow extensions which are bent back upon themselves to provide sleeves 12ᵃ. The clamping member 11 has fixed to its bottom face at intervals beyond the end of the board short narrow plates which are turned back upon themselves to form sleeves 11ᵃ, as shown in Figure 1, one at each end and one at the middle.

13 indicates an angle plate fixed to the board. It has an upright flange 14 which extends along and is engaged with the end edge of the board, and a wider horizontal flange 15 which engages the adjacent marginal bottom face of the board. Projected laterally at intervals from the upright flange 14 are sleeves 13ᵃ adapted to act as the fixed knuckles of a hinge.

16, 16 indicate studs, which are fixed in suitable openings in the board 10 adjacent the edge of the board, with their upper ends 16ᵃ, 16ᵃ projecting somewhat above the top face of the board as shown in Figure 2. One of said studs is located near one side of the board, and the other at approximately the same distance from the other side of the board. The distance between these studs corresponds to the distance between similarly spaced and disposed holes in the pay roll sheet, which is adapted to be engaged by means of said holes upon said upper ends 16ª of said studs. The pay roll sheet is thereby held against lateral or endwise movement upon the pay roll board. As shown, the horizontal flange 15 of the angle plate 13 is apertured in each case to receive a reduced end 17 of the stud 16 which is thereby riveted to said flange. Additional studs 16× are riveted at intervals throughout the length of the angle plate 13 to securely anchor it to the pay roll board.

The sleeves 11ª on the clamping member, and the sleeves 12ª on the straight edge member are so disposed in relation to each other and to the fixed hinge knuckles 13ª on the angle plate 13 that they may be and are hinged to the board by means of a hinge pin 18 which extends through them in the manner of a piano hinge, with the rotative axis of said hinge parallel to the plane of the board 10 and to the edge of the straight edge member 12.

Intermediate certain of the sleeves 11ª and 12ª are disposed springs 11ᵇ engaging the bottom face of the clamping member 11 on the side of the hinge pin 18 remote from the edge of the straight edge member, and springs 12ᵇ engaging the top face of the straight edge member 12 on the side of the hinge pin nearer the edge of the straight edge member to normally hold the clamping member and the straight edge member in engagement with the top face of the pay roll board.

The clamping member 11 is made of a flat leaf of sheet metal sufficiently rigid for the purpose. It is extended rearwardly beyond the axis of the hinge pin 18 where it is provided with a hold 19 to be engaged by the palm of the hand to swing the clamping member upon said hinge pin. The clamping member on the opposite side of the hinge pin is bent down to provide a depending shoe 11ᶜ which is adapted to directly engage with the top face of the board.

A scale is indicated at 20. Said scale extends parallel to the edge of the straight edge member 12 and is preferably milled, etched or otherwise presented on the rounded face of the part forming the shoe 11ᶜ of the clamping member.

When a pay roll sheet is to be applied or removed from the board, where the studs for engagement by the holes in the pay roll sheet are disposed as shown herein, it is necessary to raise not only the the clamping member but also the straight edge member. In the invention as illustrated, the said straight edge member is raised, when desired, in the act of raising the clamping member.

In order that the clamping member 11 and the straight edge 12 may be raised together by pressure on the hold 19 of the clamping member, a wing nut 21 with a depending stem 22 is journalled in the straight edge member 12. The clamping member 11 is provided with an elongated slot 23 extending, as shown, parallel to the edge of the straight edge member 12. Said slot is of a length and width to permit the ready passage of the wing nut 21 therethrough.

When the wing nut 21 is positioned to pass through said slot 23 as shown in Figure 1 and in Figure 2 in full lines, the raising of the clamping member 11 by pressure on its hold 19 will have no effect to raise the straight edge 12. But when said wing nut 21 is turned at right angles to the first described position to bridge the slot 23 in the clamping member 11, as shown in Figure 4, said clamping member and said straight edge member will be held together so that the clamping member and straight edge member will be raised as one when pressure is applied to the hold 19 of the clamping member.

In Figures 5 to 11, inclusive, is shown a modified form of the invention. In this case 30 indicates the pay roll board; 31, the clamping member; and 32 indicates the straight edge member. Said parts extend transversely of the board near one end thereof, as before in parallel relation to each other. 33 indicates the angle plate with the upright flange 34 and the horizontal flange 35 engaged, respectively, with the end and bottom of the board, with sleeves 33ª projecting at intervals from said upright flange 34 adapted to act as the knuckles of the fixed part of a hinge combination.

36, 36 indicate the studs fixed to the board with their upper ends 36ª projecting above the board for engagement with holes provided in the pay roll sheet.

The parts in this case are in the main substantially the same as in the first form of the invention, and are indicated by like numerals increased by 10, as in the foregoing instance. However, the straight edge member 32 instead of being bent back upon itself as in the first instance to provide the fixed knuckle for the hinge, is projected beyond the axis of the hinge to provide a heel 32×. Said heel is inclined downwardly and rearwardly so as to be at a small angle to the plane of the board 30 and to the plane of the clamping member 31 when the clamping member and straight edge member are normally engaged with the board. A complementary strap projecting at each side of the hinge pintle 38 (see Figure 11) together with the heel 32× are formed to provide a sleeve 32ª to engage the pin 38 of the hinge.

With this construction, the tension of the springs associated with each normally holds the straight edge member 32 and the clamping member 31 in engagement with the board or with the sheets upon the board, as shown in Figure 6. A depression of the hold 39 of the clamping member will raise the clamping member sufficiently to disengage the papers which are to be brought into contact with the straight edge as shown in Figure 7. A further depression of the said hold 39 will bring the clamping member into engagement with the heel 32× of the straight edge member 31, with the result that the straight edge member and the clamping member then will be swung upwardly in unison, thus disengaging both the clamping member and the straight edge member from the board. In this way the two may be held together sufficiently above the board for the engagement or disengagement of the pay roll sheet with the studs 36 as described in the first case.

The spring tension holding the straight edge member 32 in contact with the pay roll sheet is sufficient so that there is no danger of accidentally raising both members when it is desired to raise the clamping member only, to engage or disengage the employee's earning sheet.

While in describing my invention I have referred to many details of specific construction and arrangement of parts, it is to be understood that the invention is in no way limited thereto except as may be pointed out in the appended claims.

I claim as my invention:

1. In combination, a writing board, studs fixed to and rising above said board near one end thereof, an angle plate fixed to said board along said end, a straight edge member, a clamping member, said straight edge member and clamping member being disposed, in the order named, above said board and being each independently hinged to said angle plate, yielding means interposed respectively between said angle plate and each of said straight edge and clamping members adapted to normally hold them engaged with said board, said straight edge member comprising a leaf formed to provide a straight edge extending parallel to the line of said studs, said clamping member comprising a leaf having a depending shoe disposed beyond and in parallel relation to said straight edge, and means for detachably connecting said straight edge member and said clamping member together so that they may be operated as a unit.

2. In combination, a writing board, an angle plate fixed to said board along one end thereof, a straight edge member, a clamping member, said straight edge member and clamping member being disposed, in the order named, above said board and being each independently hinged to said angle plate, yielding means interposed respectively between said angle plate and each of said straight edge and clamping members adapted to normally hold them engaged with said board, said straight edge member comprising a leaf formed to provide a straight edge, said clamping member comprising a leaf having a depending shoe disposed beyond and in parallel relation to said straight edge, and means for detachably connecting said straight edge member and said clamping member together so that they may be operated as a unit.

3. In combination, a writing board, studs fixed to and rising above said board near one end thereof, an angle plate fixed to said board along said end, a straight edge member, a clamping member, said straight edge member and clamping member being disposed, in the order named, above said board and being each independently hinged to said angle plate, yielding means interposed respectively between said angle plate and each of said straight edge and clamping members adapted to normally hold them engaged with said board, said straight edge member comprising a leaf formed to provide a straight edge extending parallel to the line of said studs, said clamping member comprising a leaf having a depending shoe disposed beyond and in parallel relation to said straight edge, an upright wing bolt having a stem journalled in said straight edge member, and said clamping member having a slot through which the wing of said bolt is adapted to pass when in one position, and to be blocked from said passage when said wing is in another position, whereby the raising of said clamping member will operate to raise said straight edge member.

4. In combination, a writing board, an angle plate fixed to said board along one end thereof, a straight edge member, a clamping member, said straight edge member and clamping member being disposed, in the order named, above said board and being each independently hinged to said angle plate, yielding means interposed respectively between said angle plate and each of said straight edge and clamping members adapted to normally hold them engaged with said board, said straight edge member comprising a leaf formed to provide a straight edge, said clamping member comprising a leaf having a depending shoe disposed beyond and in parallel relation to said straight edge, an upright wing bolt having a stem journalled in said straight edge member, and said clamping member having a slot through which the wing of said bolt is adapted to pass when in one position, and to be blocked from said passage when said wing is in another position, whereby the raising of said clamping member will operate to raise said straight edge member.

5. In combination, a writing board, studs fixed to and rising above said board near one end thereof, an angle plate fixed to said board along said end, a straight edge member, a clamping member, said straight edge member and clamping member being disposed, in the order named, above said board and being each independently hinged to said angle plate, yielding means interposed respectively between said angle plate and each of said straight edge and clamping members adapted to normally hold them engaged with said board, said straight edge member comprising a leaf formed to provide a straight edge extending parallel to the line of said studs, said clamping member comprising a leaf having a depending shoe disposed beyond and in parallel relation to said straight edge, said straight edge member being provided with a heel extending rearwardly beyond the axis of the hinge of said members, said heel being normally spaced below said clamping member, but being positioned to be engaged by said clamping member after it has been swung through a predetermined angle whereby in the further movement of said clamping member the straight edge member will be swung upwardly with said clamping member.

6. In combination, a writing board, studs extending through and rising above said board near one end thereof, an angle plate fixed to said board along said end and projecting beneath said board, said angle plate providing the support for the lower ends of said studs, a straight edge member, a clamping member, said straight edge member and clamping member being disposed, in the order named, above said board and studs, and being each independently hinged to said angle plate, yielding means interposed respectively between said angle plate and each of said straight edge and clamping members, adapted to normally hold them engaged to said board, said straight edge member comprising a leaf formed to provide a straight edge extending parallel to and beyond the line of said studs, and said clamping member comprising a leaf having a depending shoe disposed beyond and in parallel relation to said straight edge member.

JOHN H. PAGE.